United States Patent
Pino et al.

(10) Patent No.: US 8,203,232 B2
(45) Date of Patent: Jun. 19, 2012

(54) EMBEDDED WIRELESS COMMUNICATIONS FOR ELECTRONIC CONTROL UNIT HAVING MULTIPLE GROUND REFERENCES

(75) Inventors: Rafael Jimenez Pino, Valls (ES); Miguel Angel Aceña, Valls (ES)

(73) Assignee: Lear Corporation, Southfield, MI (US)

( * ) Notice: Subject to any disclaimer, the term of this patent is extended or adjusted under 35 U.S.C. 154(b) by 300 days.

(21) Appl. No.: 12/635,001

(22) Filed: Dec. 10, 2009

(65) Prior Publication Data

US 2011/0140512 A1     Jun. 16, 2011

(51) Int. Cl.
*B60L 1/00* (2006.01)
(52) U.S. Cl. ...................................... 307/10.1
(58) Field of Classification Search .................. 307/10.1
See application file for complete search history.

(56) References Cited

U.S. PATENT DOCUMENTS

| | | | |
|---|---|---|---|
| 8,035,255 B2 * | 10/2011 | Kurs et al. .................. | 307/104 |
| 2009/0078481 A1 | 3/2009 | Harris | |
| 2009/0174353 A1 | 7/2009 | Nakamura et al. | |
| 2009/0184760 A1 | 7/2009 | Hauenstein | |
| 2010/0106351 A1 * | 4/2010 | Hanssen et al. ............. | 701/22 |

* cited by examiner

*Primary Examiner* — Robert L. DeBeradinis
(74) *Attorney, Agent, or Firm* — Brooks Kushman P.C.

(57) ABSTRACT

A system configured to facilitate wireless communications between different ground planes is provided. The system may rely on bi-directional communications between galvanically isolated components to support any number of operations, including but not limited operations associated with supporting wireless message communications between three or more isolated ground planes, such as but not limited to supporting communications between three or more ground planes included within an onboard vehicle charger.

18 Claims, 3 Drawing Sheets

EMBEDDED WIRELESS COMMUNICATIONS FOR ELECTRONIC CONTROL UNIT HAVING MULTIPLE GROUND REFERENCES

BACKGROUND OF THE INVENTION

1. Technical Field

The present invention relates to wireless communications between elements included on different ground planes, such as but not limited to supporting wireless communications within a vehicle having multiple isolated power systems.

2. Background

Devices having two galvanically isolated ground planes have relied on optocouplers to support data communications between the ground planes. Optocouplers can be problematic since they require a dedicated communication channel between each of the communicating elements, i.e., one element cannot use a single optocoupler to communicate with multiple elements. Some elements configure theses dedicated communication channels in a serial arrangement where one channel is configured to run between multiple elements. This channel, for example, would connect a first element by way of a first optocoupler to a second element, connected the second element by way of a second optocoupler to a third element, and connected the third element by way of a third optocoupler to the first element. This type of serial configuration requires message to travel in a single direction, to be serially addressed, and to pass through multiple optocouplers whenever the message is not intended for the immediately following element. This can be problematic should one of the optocouplers fail as it can prevent message distribution to any device located downstream of the failed optocoupler.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 1:
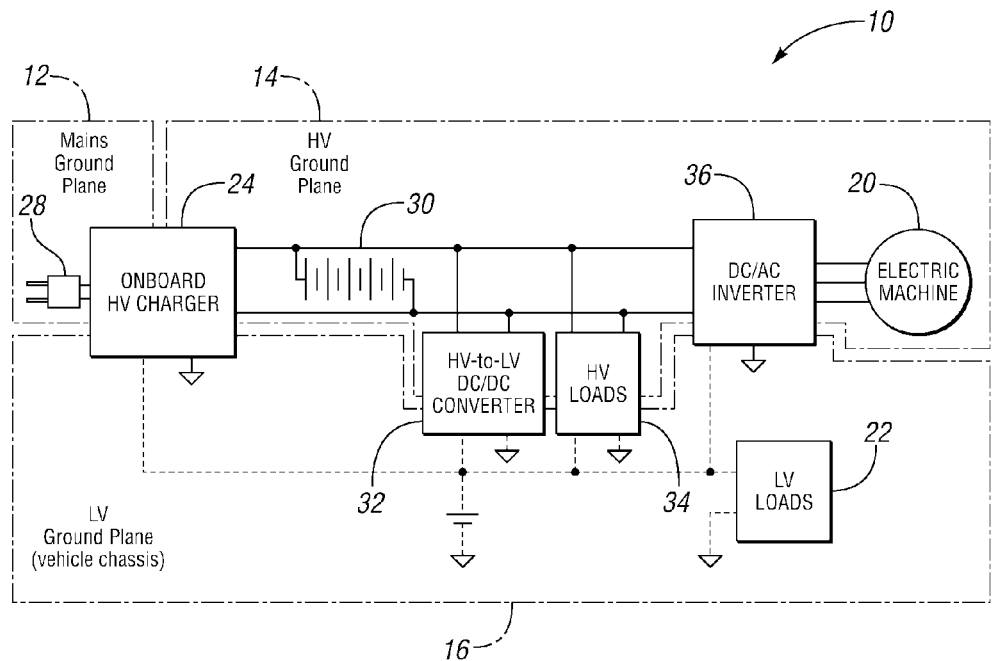
FIG. 1 illustrates a vehicle system having three isolated power systems in accordance with on non-limiting aspect of the present invention.

FIG. 1 illustrates a vehicle system 10 having three isolated power systems 12, 14, 16 in accordance with on non-limiting aspect of the present invention. The three power systems 12, 14, 16 are referred to as a mains power system 12, a high voltage (HV) power system 14, and a low voltage (LV) or data network power system 16. Each of the power systems 12, 14, 16 may be considered to be electrically isolated from each other in the sense that electric current does no flow directly between the power systems 12, 14, 16, i.e. the power systems 12, 14, 16 may be galvanically isolated from each other. The power systems 12, 14, 16, however, are interconnected in that energy can be carried therebetween through capacitive or inductive coupling and through other wireless forms of communication.

The power systems 12, 14, 16 are generically referenced with respect to the operations associated therewith and without intending to limit the scope and contemplation of the present invention. The mains power system 12 is configured to connect to a domestic or non-vehicle power system, such as but limited to the type that operates at 110 Vac at 60 Hz or 220 Vac at 50 Hz. The HV power system 14 is configured to support electric diving capabilities by powering an electric motor 20, such as but not limited to the type that operates in the range of 300-400 Vdc. The LV power system 16 is configured to support data communications between the various devices used to support operation of the other power systems and its own devices 22 used to support lower voltage operations, such as but not limited to the type that operates at approximately 12 Vdc.

Figure 2:
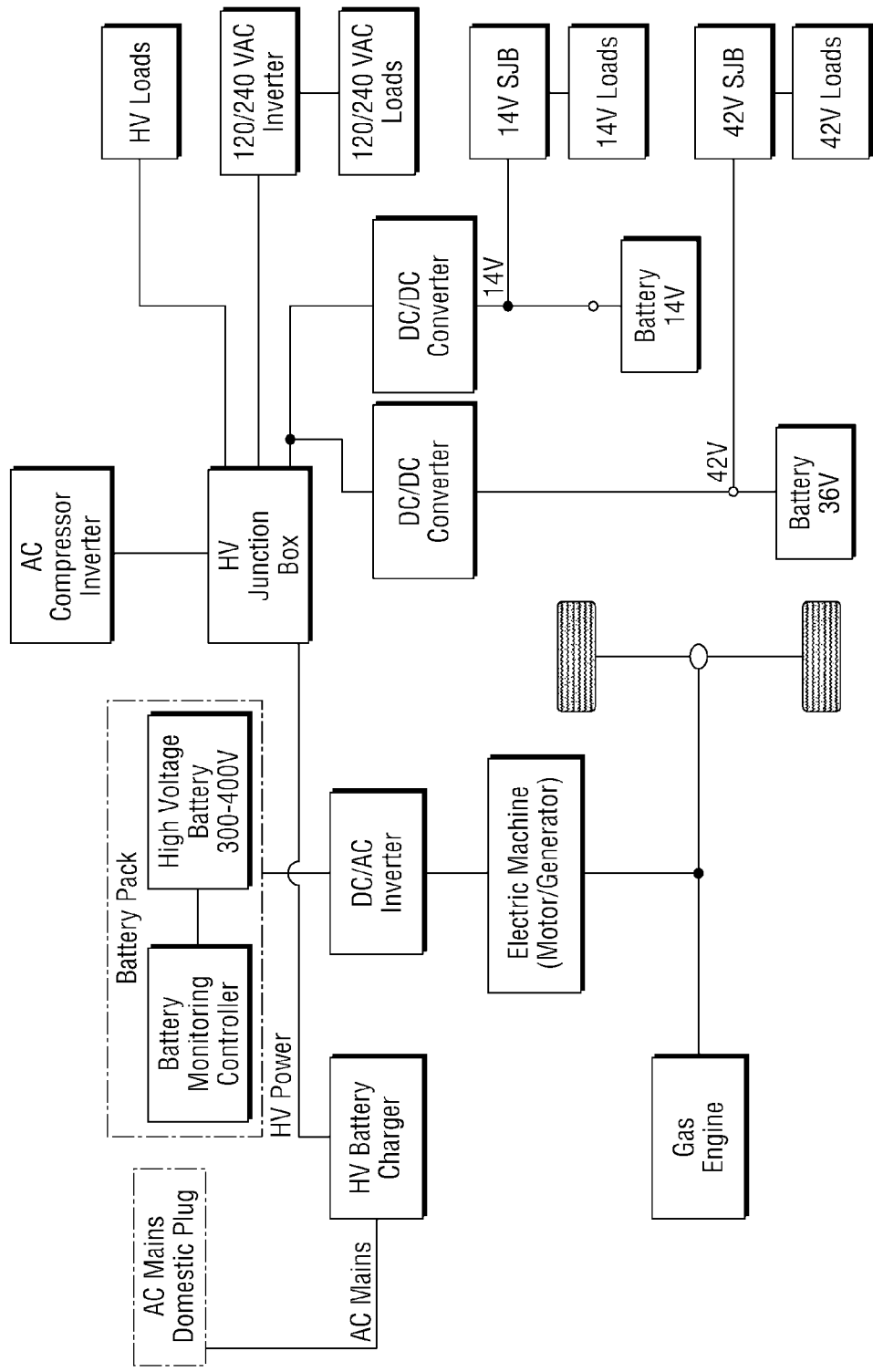
FIG. 2 schematically illustrates other devices that may be included to support a number of vehicle related operations in accordance with one non-limiting aspect of the present invention.

The system 10 may include an onboard charger 24 that interacts with each of the three isolate power systems 12, 14, 16. The onboard charger 24 may be configured to support charging the HV and LV power systems 14, 16 from energy provided by a domestic wall outlet or other charging source 28. As shown in FIG. 1, energy from the charger 24 flows to a HV battery 30, a HV/LV, DC/DC converter 32, one or more HV loads 34, a DC/AC inverter 36 used to drive the electric motor 20, and by way of the converter 32, to one or more of the LV loads 22. Each of these devices are connected to one or more of the power systems 12, 14, 16 and ground planes associated therewith, referred to as a mains ground plane, a HV ground plane, and a LV ground plane. FIG. 1 only illustrates an exemplary portion of the devices that may be included within the system. FIG. 2 schematically illustrates other devices that may be included within system to support a number of vehicle related operations in accordance with one non-limiting aspect of the present invention.

Figure 3:
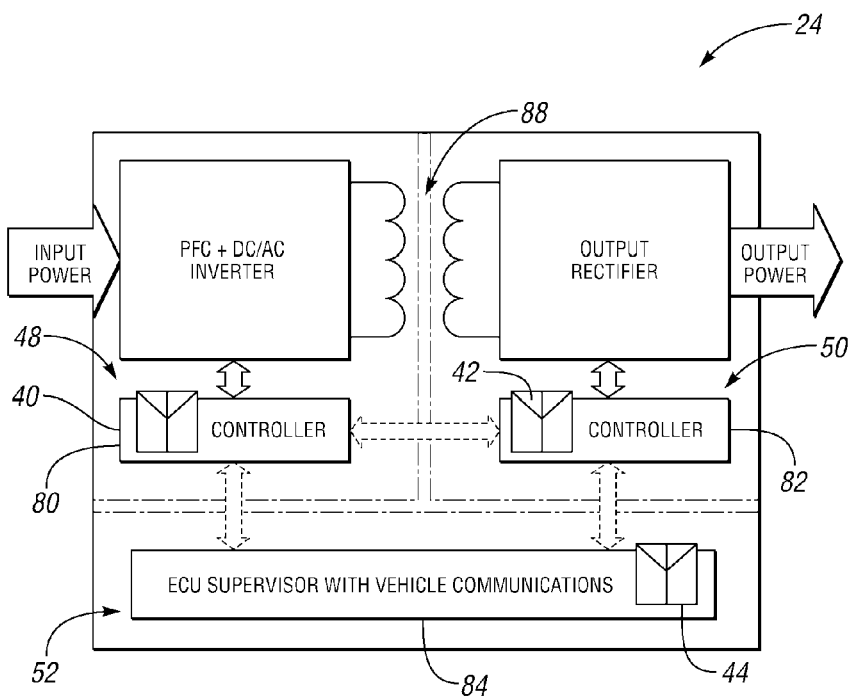
FIG. 3 illustrates the connection of the charger to each of the three isolated power systems in accordance with one non-limiting aspect of the present invention.

The devices shown in FIG. 1 include an interface to the LV system 16 to support data communications and other operations, which is represented for each device with an arrow. The arrows are intended to represent data interfaces and not grounding of the devices. Each of the components (not shown) comprising the devices may be grounded to one of the ground planes, and depending on the configuration of the device, multiple components may be included on a printed circuit board (PCB) such that some of the components may be grounded to one of the grounds and another portion of the components may be grounded to another one of the of the grounds planes, e.g. the charger is shown to include components within the same PCB that are grounded to each of the mains, HV, and LV ground planes. FIG. 3 illustrates the connection of the charger to each of the three isolated power system in accordance with one non-limiting aspect of the present invention.

Each of the ground planes used to support operations of the noted devices may be galvanically isolated from each other in that current cannot directly flow therebetween. As such, any communication required between device controllers and other intelligently functioning elements necessary to insuring operations of the devices may take place without relying on direct current flow, i.e., without relying on some type of wireline communication. In accordance with one non-limiting aspect of the present invention, the system may be configured to support wireless communications between one or more of the galvanically isolated devices/elements. The wireless communications may be beneficial in improving communication speed and safety over optocoupler based systems in that a single message may be simultaneously transmitted from one source to multiple recipients without having to pass through a corresponding number of optocouplers. In the event one of the message receiving recipients fail to receive or to properly process the message, the present invention allows the message to still be received by the other recipients, i.e., the failing recipient does not necessarily affect the ability of the message to reach other recipients.

Figure 4:
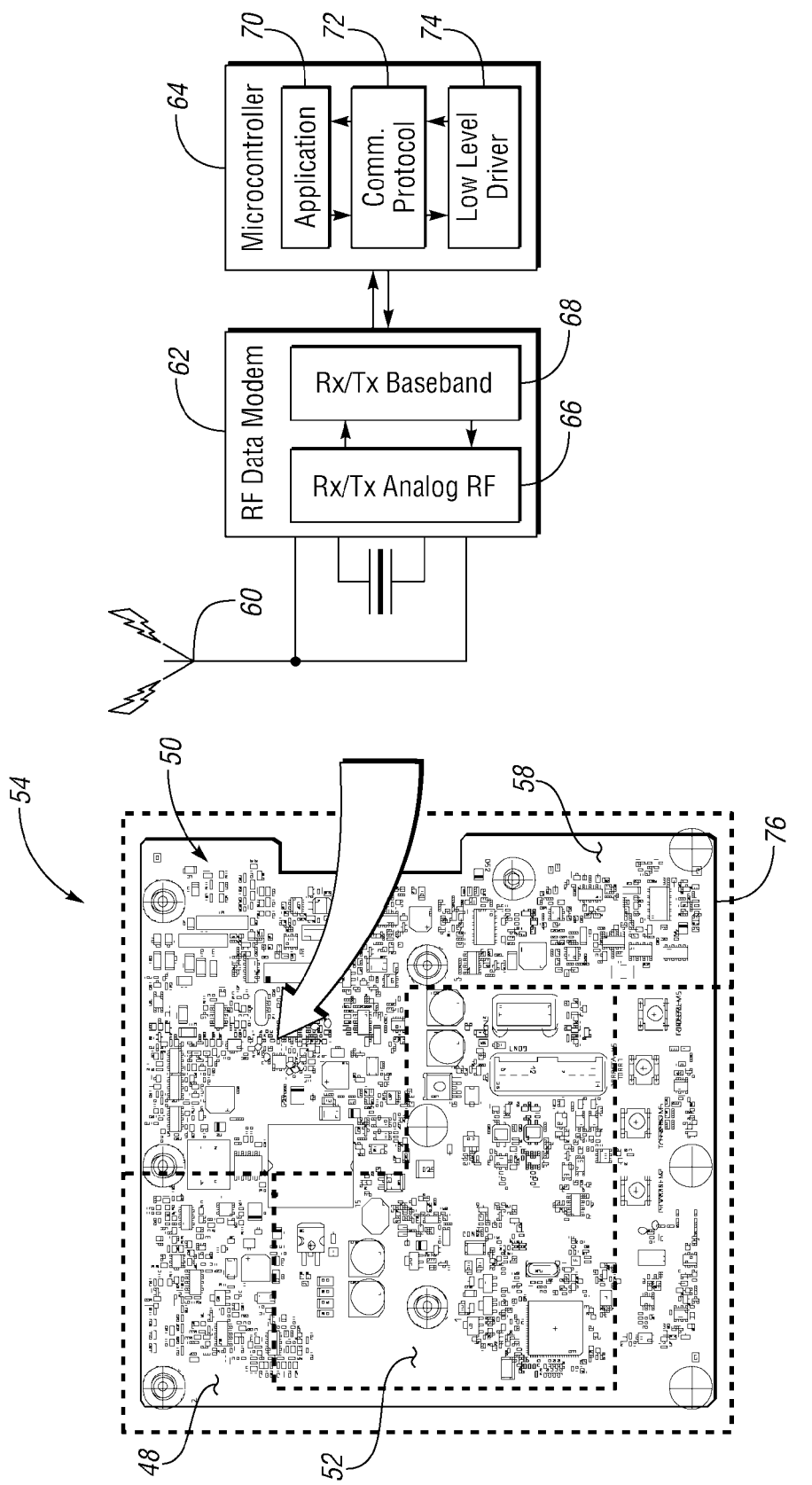
FIG. 4 illustrates an exemplary configuration of a control board where components block are included on the same PCB and galvanically isolated from each other in accordance with one on limiting aspect of the present invention.

The charger is shown to include wireless interfaces 40, 42, 44 within a primary stage block 48, a secondary block portion 50 and a communications block 52. Each of the blocks 48, 50, 52 may be comprised of any number of components and elements necessary to implementing the function and operations contemplated by the present invention. Each of these components may be included on the same or different PCBs and galvanically isolated from the components of the other blocks. FIG. 4 illustrates an exemplary configuration of a control board 54 included as part of the charger 24 to control power components and other bulkier components that may be included on another PCB away from the more sensitive control components. The components of each block 48, 50, 52 are shown to be included on the same PCB 58 and galvanically isolated from each other in accordance with one on limiting aspect of the present invention. To facilitate the exchange of data between each of the electrically isolated blocks, the wireless interfaces 40, 42, 44 may be included within each block 48, 50, 52.

Each of the wireless interfaces 40, 42, 44 may include an antenna 60, an RF data modem 62, and a microcontroller 64. The RF data modems 62 may include a Rx/Tx analog RF transceiver 66 and an Rx/Tx Baseband transceiver 68. The baseband transceiver 68 may be comprised of digital communication elements, such as but not limited to SPI and I2C, to support in-board communications with the microcontroller 64. The RF transceiver 66 may be configured to receive the digital data from the microcontroller 64, through a digital bus, and modulate it up to a standard RF in order to emit the data and vice-versa to receive data. The microcontrollers 64 may include an application layer 70, a communication protocol layer 72, and a device driver layer 74 to facilitate the message based wireless communications contemplated by the present invention. Each of these components may be included within an enclosure (referenced by a footprint 76) provided by a housing such that any wireless signals set between the interfaces are shielded by the enclosure from emitting beyond the housing. Optionally, the wireless range of the interfaces 40, 42, 44 may be restrained to limit emission of the wireless signals, such as by limiting the range of the signals to twice the length of the PCB 58. Of course, the present invention is not intended to be limited to the illustrate configuration of the wireless interfaces 40, 42, 44 and fully contemplates the use of any other wireless interface that operations within the bounds or performs functions similar those contemplated herein.

Returning to FIG. 3, each of the wireless interfaces 40, 42, 44 are illustrated as being part of a controller 80, 82, 84 associated with each of the blocks. The controllers 80, 82, 84 are schematically representations of any number of the components responsible for supporting and controlling the operation performed by each block 48, 50, 52. The primary stage block 48 may be responsible for managing power carried over the mains power system 12, i.e., that which may be provided while charging the vehicle from a domestic call outlet, and transferring that power to the secondary block 50. The secondary block 50 may be responsible for managing power received from primary block 48 for distribution to one or more of the devices illustrated within the systems of FIGS. 1 and 2. The controller 84 of the communications block 52 may be configured to provide feedback from the devices receiving the power to each of the controllers 80, 82 responsible for controlling the primary and secondary blocks 48, 50 in order to insure proper charging and to otherwise maintain safety.

The charger 24 may include a transformer 88 and a number of associated power elements (not shown) to facilitate the transfer of energy between the mains power system 12 and HV power system 14. Since the mains power supply is acting as an AC source, the transformer 88 and associated power elements (which are may be included on a PCB separate from the illustrated control blocks) may be arranged into an inverter configuration to support inversion of the AC energy to DC energy. Without deviating from the scope and contemplation of the present invention, however, the transformer 88 and associated power elements may be configured as a converter that converts energy from a DC source to the DC energy desired by the HV system. The primary and secondary block controllers 80, 82 may be configured to control switching and other operations of the respective power elements according to messages wirelessly received from the other wireless interfaces 40, 42, 44.

Depending on the operating parameters of the system 10 and the information relied upon by the controllers 80, 82, 84 to control their respective operations; different messages may be required from one or more of the wireless interfaces 40, 42, 44. For example, when data originating from one of the devices connected to the LV power system 16 is desired, a single message corresponding to that data may be simultaneously transmitted from the communications wireless interface 44 to each of the first block wireless interface 40 and the second block wireless interface 42. (Each device having an interface to the data network may rely on the data network and the communications controller 84 to communicate relevant data to the other controllers 80, 82.) Optionally, each of the receiving wireless interfaces 40, 42 may be requested to transmit an acknowledgment message upon receipt of the message in order to assure proper receipt. The communications wireless interface may generate a warning message to indicate failure of one of the acknowledgment transmitting wireless interfaces 40, 42 in the event only one acknowledgment is received.

Optionally, additional redundancy may be included by mirroring each of the wireless interface 40, 42, 44 with an additional interface capable of supporting the same wireless communications in the event of the failure of the other and/or optocouplers or a galvanic connection may be included as a back-up in the event that one of the wireless interfaces 40, 42, 44 fails. In the case of additional optocoupler or a galvanic connection, these backup connections may be configured to support serial communications, i.e., messages may be required to traverse multiple controller blocks before reaching a destination, and/or separate paths may be include to each wireless interface so that message can travel directly between the origination and destination locations, i.e., without having to be relayed by another one of the wireless interfaces. The implementation of the backup circuits may occur on a case-by-case basis in that one or more of the paths may be selectively enabled without having to enable all of the paths in order to allow some combination of wireline and wireless communications between the different blocks.

As supported above, three different microcontrollers (MCUs) may be implemented on each different ground planes (12V battery ground reference, Mains ground reference and high voltage ground reference). All the MCUs need to know the global ambient temperature that is calculated in the 12V battery MCU by means of the local temperatures that are captured for all the units (each MCU captures the local temperature by reading a temperature sensor placed on each ground plane). All these local measurements may be wirelessly sent to the MCU that makes the final calculation and then the final result is sent to all the units in order to set the working point for the functionality. With the RF link contemplated by one non-limiting aspect of the present invention, the captured local data may be transmitted to the MCUs independently (each MCU sends the data as it's available, with no dependence on the execution on the rest of the units). The unit that processes the information produces the result and broadcasts it to the system so that the speed of information flow is maximized. This may be faster than each local temperature being measured and sent by using an isolated link (typically an optocoupler) to the MCU in charge of the calculation such that the final determination is only made after all the values are transmitted to the rest of the MCUs. The information distributed according to the present invention may be accomplished in a more uniform way, so that it's easier to set a synchronism for all the signals. Furthermore the information can be sent to all the units at the same time (broadcast mode) or in an individual mode, thereby allowing a higher flexibility for improving or introducing changes. Moreover, it the event critical-system information is to be shared among the three microcontrollers, any single link between two MCUs for a dedicated closed-loop control function can be replaced in case of a temporal MCU outage by the link with the third redundant MCU to keep the system operation safe.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention. The features of various implementing embodiments may be combined to form further embodiments of the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A power electronics device for use onboard a vehicle having three or more isolated power systems, the power electronics device comprising:
   a converter for managing energy flow between a first one and a second one of the isolated power systems, the converter having a first stage on a first ground plane and a second stage on a second ground plane, the first and second ground planes being galvanically isolated from each other and including a plurality of switching power elements to facilitate managing energy flow between the first and second isolated power systems; and
   an electronic control system (ECS) configured to control the switching power elements according to messages received from each of the isolated power systems, the ECS using wireless radio frequency communications to communicate the messages between each of the isolated power systems.

2. The device of claim 1 further comprising a first transceiver on the first ground plane, a second transceiver on the second ground plane, and a third transceiver on a third ground plane, the third ground plane used on by a data network of a third isolated power system, the third isolated power system being galvanically isolated from each of the first and second ground planes, wherein the ECS uses the first transceiver, the second transceiver and the third transceiver to communicate the messages between each of the isolated power systems.

3. The device of claim 2 wherein each message is transmitted from one of the first transceiver, the second transceiver and the third transceiver and received by each of the other transceivers.

4. The device of claim 2 wherein each transceiver is configured to support bi-directional communications with each other.

5. An onboard high voltage charger for use in a vehicle having a mains power system, a high voltage (HV) power system, and a low voltage (LV) power system, each of the mains, HV, and LV power systems having electrically isolated ground planes, respectively referred to as a mains ground plane, an HV ground plane, and an LV ground plane, the charger comprising:
   a transformer for transferring energy from the main power system to the HV power system through an electrical coupling between a primary coil of a primary stage and a secondary coil of a secondary stage, the primary coil connecting to the mains power system and the secondary coil connecting to the HV power system, wherein energy flow to the primary coil is controlled with a first plurality of power elements and energy flow from the secondary coil is controlled with a second plurality of power elements; and
   an electronic control unit (ECU) configured to control the first and second plurality of power elements, the ECU having a mains wireless interface, an HV wireless interface, and an LV wireless interface respectively connected to the mains, HV, and LV ground planes, the ECU relying on wireless exchange of messages between each of the wireless interfaces to control operations of the first plurality of power elements and the second plurality of power elements, wherein the mains wireless interface, the HV wireless interface and the LV wireless interface are galvanically isolated from each other
   wherein the wireless interfaces wirelessly exchange messages according to a redundant, data communication protocol that requires each of a transmitting one of the wireless interfaces to broadcast the message to each non-transmitting wireless interface.

6. The charger of claim 5 wherein the data communication protocol only permits one of the wireless interfaces to transmit data at the same time.

7. The charger of claim 5 wherein each of the non-transmitting wireless interfaces transmits an acknowledgement to the transmitting one of the wireless interfaces after receipt of the transmitted data.

8. The charger of claim 7 wherein one of the wireless interfaces receiving the acknowledgements transmits a warning message to indicate failure of one of the acknowledgment transmitting mains wireless interface, HV wireless interface and LV wireless interface in the event only one acknowledgment is received.

9. The charger of claim 5 wherein each message includes an identification of the wireless interface intended to receive the message.

10. The charger of claim 5 wherein each of the mains wireless interface, the HV wireless interface and the LV wireless interface includes a microcontroller and an RF data modem, each microcontroller configured to process messages carried over networks of the respective power systems.

11. The charger of claim 5 further comprising one or more printed circuit boards (PCBs) connected to each of the transformer, first plurality of power elements and second plurality of power elements, mains wireless interface, HV wireless interface and LV wireless interface and ECU.

12. The charger of claim 11 further comprising a housing configured to protect each PCB, transformer, power elements, wireless interfaces, and ECU within an enclosure.

13. The charger of claim 12 wherein the housing prevents wireless signals transmitted between the mains wireless interface, the HV wireless interface and the LV wireless interface from emitting beyond the enclosure.

14. The charger of claim 11 wherein a wireless communication range of each of the mains wireless interface, the HV wireless interface and the LV wireless interface is not more than twice a length of the PCB.

15. An onboard high voltage charger for use in a vehicle having a mains power system, a high voltage (HV) power system, and a data network, each of the mains power system, HV power system, and the data network having electrically isolated ground planes, respectively referred to as a mains ground plane, an HV ground plane, and a data network ground plane, the charger comprising:

a transformer for transferring energy from the mains power system to the HV power system through an electrical coupling between a primary coil of a primary stage and a secondary coil of a secondary stage, the primary coil connecting to the mains power system and the secondary coil connecting the HV power system, wherein energy flow to the primary coil is controlled with a first plurality of power elements and energy flow from the secondary coil is controlled with a second plurality of power elements; and an electronic control unit (ECU) configured to control the first and second plurality of power elements, the ECU having a mains wireless interface, an HV wireless interface, and a data network wireless interface respectively connected to the mains, HV, and data network ground planes, the ECU controlling the first plurality of power elements and the second plurality of power elements based in part on messages transmitted from the data network wireless interface to at least one of the mains wireless interface and the HV wireless interface, wherein at least a portion of the messages transmitted from the data network wireless interface originate from one or more data collecting elements connected to the data network wherein the data network wireless interface transmits each message to both of the mains and HV wireless interfaces and each of the mains and HV wireless interface generate an acknowledgment message upon receipt thereof.

16. The charger of claim 15 wherein the mains wireless interface, the HV wireless interface and the LV wireless interface are galvanically isolated from each other.

17. The charger of claim 15 wherein each of the one or more data collecting elements is galvanically isolated from each of the mains ground plane and the HV ground plane.

18. The charger of claim 15 wherein the ECU transmits a warning message to indicate failure in the event only one acknowledgment is received by the data network wireless interface and wherein the ECU relies on backup non-wireless communications to execute communications previously executed by the failed one of the mains wireless interface, the HV wireless interface and the LV wireless interface.

* * * * *